United States Patent
Kim et al.

(10) Patent No.: US 9,042,346 B2
(45) Date of Patent: May 26, 2015

(54) MOBILE RELAY STATION AND HANDOVER METHOD THEREOF

(71) Applicant: ELECTRONICS AND TELECOMMUNICATIONS RESEARCH INSTITUTE, Daejeon (KR)

(72) Inventors: Won-Ik Kim, Daejeon (KR); Sung Kyung Kim, Daejeon (KR); Seokki Kim, Gyeonggi-do (KR); Mi Young Yun, Daejeon (KR); Hyun Lee, Daejeon (KR); Chul Sik Yoon, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 162 days.

(21) Appl. No.: 13/874,936

(22) Filed: May 1, 2013

(65) Prior Publication Data
US 2013/0294330 A1 Nov. 7, 2013

(30) Foreign Application Priority Data

May 4, 2012 (KR) .................. 10-2012-0047206
Apr. 25, 2013 (KR) .................. 10-2013-0046339

(51) Int. Cl.
*H04B 7/14* (2006.01)
*H04W 4/00* (2009.01)
*H04W 36/00* (2009.01)
*H04W 36/08* (2009.01)
*H04W 84/04* (2009.01)

(52) U.S. Cl.
CPC .......... *H04W 36/0005* (2013.01); *H04W 36/00* (2013.01); *H04W 36/08* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 2007/0086388 A1* | 4/2007 | Kang et al. | 370/331 |
| 2008/0219275 A1* | 9/2008 | Boariu et al. | 370/401 |
| 2009/0088164 A1* | 4/2009 | Shen et al. | 455/436 |
| 2009/0149179 A1 | 6/2009 | Shim et al. | |
| 2010/0061339 A1 | 3/2010 | Kim et al. | |
| 2010/0080193 A1* | 4/2010 | Sakai | 370/332 |
| 2010/0322197 A1 | 12/2010 | Adjakple et al. | |
| 2011/0134887 A1* | 6/2011 | Jeon et al. | 370/331 |

FOREIGN PATENT DOCUMENTS

| | | | |
|---|---|---|---|
| KR | 10-2008-0043682 A | 5/2008 | |
| KR | 10-2009-0061244 A | 6/2009 | |
| KR | 10-2010-0016780 A | 2/2010 | |

OTHER PUBLICATIONS

IEEE Std 802.16j-2009, "Part 16: Air Interface for Broadband Wireless Access Systems, Amendment 1: Multiple Relay Specification", IEEE Computer Society and the IEEE Microwave Theory and Techniques Society, Jun. 12, 2009.

* cited by examiner

*Primary Examiner* — Kodzovi Acolatse
(74) *Attorney, Agent, or Firm* — Rabin & Berdo, P.C.

(57) ABSTRACT

A mobile relay station (RS) and a handover method thereof are provided. When it is determined that a mobile RS performs handover from a superordinate base station (BS) to a target BS, information indicating admission of handover is received from the superordinate BS. The mobile RS transmits a service unavailability section to a subordinate terminal, whereby the subordinate terminal is prevented from performing handover to a different BS or a different RS.

13 Claims, 5 Drawing Sheets

MOBILE RELAY STATION AND HANDOVER METHOD THEREOF

CROSS-REFERENCE TO RELATED APPLICATION

This application claims priority to and the benefit of Korean Patent Application Nos. 10-2012-0047206, and 10-2013-0046339 filed in the Korean Intellectual Property Office on May 4, 2012, and Apr. 25, 2013, respectively, the entire contents of which are incorporated herein by reference.

BACKGROUND OF THE INVENTION (a) Field of the Invention

The present invention relates to a mobile relay station (or a relay, a repeater, or the like) and a handover method thereof.

(b) Description of the Related Art

In a wireless communication system environment, a mobile relay station establishes a relay link with a superordinate base station and serves to relay data from subordinate terminals to the superordinate base station through the relay link.

When signal quality of the superordinate base station, establishing the relay link with the mobile relay station, is degraded while signal quality of a neighbor base station is increased, the mobile relay station performs handover to the neighbor base station.

$3^{rd}$ wireless communication international standards such as existing IEEE 802.16j define techniques in consideration of even a mobile relay station as well as a fixed type relay station, in which, thus, methods and procedures with respect to handover of relay stations are defined. However, $4^{th}$ wireless communication international standards such as IEEE 802.16m define techniques in consideration of only fixed type relay stations, without defining handover methods and procedures of mobile relay stations.

Meanwhile, in the existing handover method and procedure of a mobile relay station, there is a service interruption period due to handover of a mobile relay station, and due to the service interruption period, subordinate terminals may perform handover twice. During the service interruption period due to handover of a mobile relay station, subordinate terminals may determine that they are not within service coverage of a serving relay station to which the subordinate terminals are connected, so they attempt handover to a different relay station or a base station. After the handover of the mobile relay station to a neighbor base station is completed, the subordinate terminals perform handover again to the mobile relay station (i.e., the previous serving relay station).

SUMMARY OF THE INVENTION

The present invention has been made in an effort to provide a handover method and procedure of a mobile relay station.

An exemplary embodiment of the present invention provides a handover method of a mobile relay station (RS) relaying data from a subordinate terminal to a first base station (BS). The handover method of the mobile RS may include: determining whether to perform handover from the first BS to a second BS; when it is determined to perform handover in the determining operation, receiving a first message including a first information indicating whether handover is admitted, from the first BS; and when handover admission information is included in the first message, transmitting a second message including a service unavailability section during which a service is not provided to the subordinate terminal, to the subordinate terminal.

The first message may further include a second information indicating that RS configuration information of the mobile RS is not changed. The second message may further include the second information.

The handover method of a mobile RS may further include: performing handover to the second BS; starting a relay mode in which data of the subordinate terminal is relayed to the second BS; and providing a service to the subordinate terminal. The service unavailability section may be set in consideration of the operation of performing handover; the operation of starting the relay mode, and the operation of providing a service. The providing of the service may include providing the service to the subordinate terminal after the service unavailability section terminates.

The receiving of the first message may include: requesting handover from the first BS; and receiving the handover admission information and the second information from the first BS.

The first message may further include second information indicating that RS configuration information of the mobile RS has been changed.

The handover method of a mobile RS may further include: receiving a third message including the changed RS configuration information from the first BS.

The third message may further include an action time indicating when to start the changed RS configuration information.

The handover method of a mobile RS may further include: transmitting the changed RS configuration information to the subordinate terminal.

The second message may further include second information.

The handover method of a mobile RS may further include: when the second information indicating that the handover is not admitted is included in the first message, releasing the relay mode after the second information is transmitted to the subordinate terminal.

Another embodiment of the present invention provides a communication method of a terminal which is connected to a first base station (BS) through a mobile relay station (RS). The communication method of a terminal may include: when it is determined that the mobile RS performs handover from the first BS to a second BS, receiving a first message including a service unavailability section during which the mobile RS cannot provide a service to the terminal, from the mobile RS; and not performing connection to the mobile RS during the service unavailability section, and performing connection to the mobile RS after the service unavailability section terminates.

The first message may include information indicating that RS configuration information of the mobile RS has not been changed.

The first message may further include information indicating that RS configuration information of the mobile RS has been changed, wherein the method may further include: receiving the changed RS configuration information from the mobile RS.

Yet another embodiment of the present invention provides a mobile relay station (RS). The mobile RS may include: a radio frequency (RF) module; and a processor connected to the RF module and provide control to relay data from a subordinate terminal to a first base station (BS), wherein when it is determined that handover is performed from the first BS to a second BS, the processor may provide control to receive a first message indicating admission of the handover from the first BS and provide control to transmit a second message including a service unavailability section during which a service cannot be provided to the subordinate terminal, to the subordinate terminal.

The first message and the second message may include information indicating that relay station (RS) configuration information of the mobile RS has not been changed.

The first message may further include information indicating that relay station (RS) configuration information of the mobile RS has been changed, wherein the processor may provide control to transmit the changed RS configuration information to the subordinate terminal.

The processor may provide control to provide a service to the subordinate terminal after the service unavailability section terminates.

According to an embodiment of the present invention, when a mobile relay station (RS) performs handover, it transmits a service unavailability section to a subordinate terminal to prevent the subordinate terminal from performing unnecessary handover.

Also, according to an embodiment of the present invention, when a mobile RS performs handover, an action time thereof can be minimized and a service disconnection of a subordinate terminal and a network re-access procedure thereof that may be caused due to handover of the mobile RS can be reduced.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to a mobile terminal (MT), a mobile station (MS), an advanced mobile station (AMS), a high reliability mobile station (HR-MS), an subscriber station (SS), a portable subscriber station (PSS), an access terminal (AT), a user equipment (UE), or the like, and may include an entirety or a portion of functions of an MT, an MS, an AMS, an HR-MS, an SS, a PSS, an AT, a UE, or the like.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, or the like, and may include the entirety or a portion of functions of an ABS, a node B, an eNodeB, an AP, an RAS, a BTS, an MMR-BS, or the like.

Also, a relay station (RS) may refer to a relay station (RS) serving as a base station, a high reliability relay station (HR-RS) serving as a base station, a high reliability mobile station (HR-MS) serving as a relay station, or the like, and may include the entirety or a portion of functions of an RS, an HR-RS, an HR-MS, or the like.

Hereinafter, a mobile relay station and a handover method thereof according to embodiments of the present invention will be described in detail with reference to the accompanying drawings.

Figure 1:
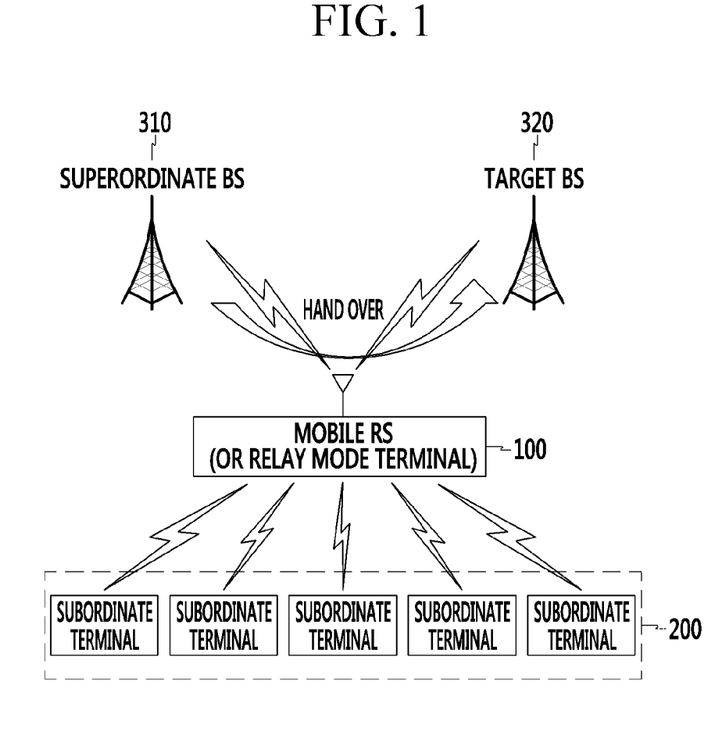
FIG. 1 is a view illustrating a wireless communication system according to an embodiment of the present invention.

FIG. 1 is a view illustrating a wireless communication system according to an embodiment of the present invention.

As illustrated in FIG. 1, a wireless communication system according to an embodiment of the present invention includes a superordinate base station (BS) 310, a target base station 320, a mobile relay station (RS) 100, and a subordinate terminal 200.

The superordinate BS 310 is a BS providing a communication service to the mobile RS 100 before the mobile RS 100 performs handover, and the target BS 320 is a BS to which the mobile RS 100 wants to perform handover due to a movement of the mobile RS 100, or the like.

The mobile RS 100 establishes a relay link with the superordinate BS 310 and serves to relay data from the subordinate terminal 200 connected thereto to the superordinate BS 310. Meanwhile, in FIG. 1, the mobile RS 100 is illustrated to establish a relay link with the superordinate BS 310, but the present invention is not limited thereto and a terminal operating in an RS mode (i.e., an RS mode terminal) may also form a relay link together with the superordinate BS 310. The mobile RS 100 or the RS mode terminal establishing a relay link with the superordinate BS 310 will be referred to as a 'mobile RS 100' hereinafter, for the description purpose.

Meanwhile, when the mobile RS 100 performs wireless connection to the superordinate BS 310, it performs a wireless connection in the same manner as that of a general mobile terminal. After the wireless connection to the superordinate BS 310 is completed, the mobile RS 100 is changed into an RS mode through a signaling procedure with the superordinate BS 310. Here, the superordinate BS 310 stores mobile terminal information of the mobile RS 100 (e.g., a station identifier (STID) of the mobile RS 100), and subsequently map it to information regarding relay link establishment (RS configuration information) and store the same. Namely, the mobile terminal information (an STID or a MAC address) of the mobile RS 100 and the RS configuration information are mapped to each other. Thus, as the handover signaling procedure of the mobile RS 100 according to an embodiment of the present invention described hereinafter, a general mobile terminal handover signaling procedure may be reused, and some fields are added for effective handover.

As illustrated in FIG. 1, in a case in which signal quality of the superordinate BS 310 forming a relay link is degraded and signal quality of the target BS 320 as a neighboring BS is increased, the mobile RS 100 performs handover to the target BS 320.

Hereinafter, a signaling procedure performed between the mobile RS 100 and the superordinate BS 210, a signaling procedure performed between the superordinate BS 310 and the target BS 320, and a signaling procedure performed between the mobile RS 100 and the subordinate terminals 200, required when the mobile RS 100 performs handover will be described. A handover signaling procedure of the mobile terminal 100 is divided into three types according to whether or not the target BS 320 admits handover of the mobile RS 100 and whether or not there is a change in an RS configuration with respect to a DL/UL access link that may be provided to the subordinate terminal 200 after the mobile RS 100 performs handover.

Meanwhile, in the handover signaling procedure of the mobile RS 100 according to an embodiment of the present invention, information about a service unavailability section due to handover of the mobile RS 100 is provided to the subordinate terminal 200, whereby the subordinate terminal 200 may be prevented from performing unnecessary handover.

Figure 2:
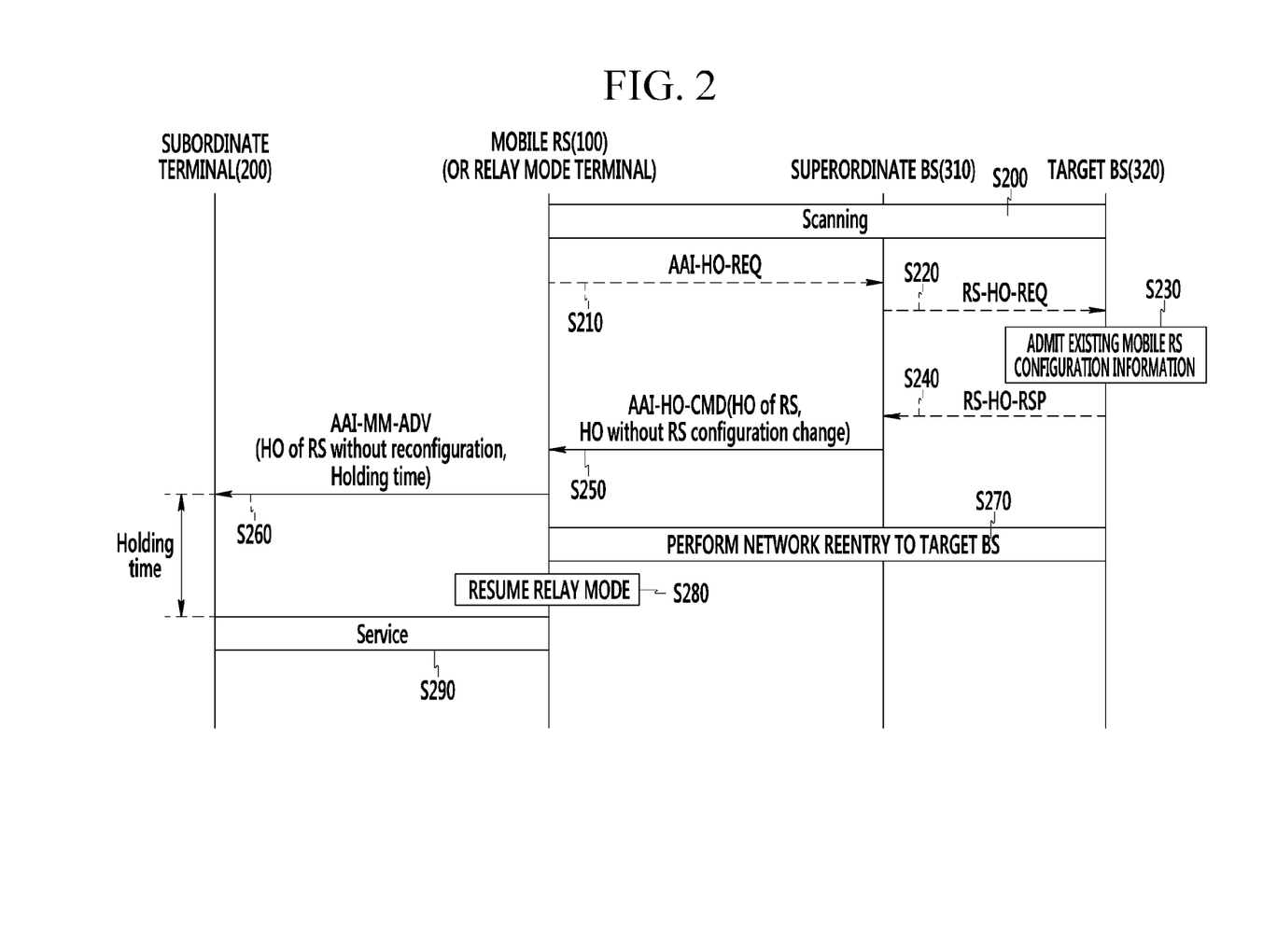
FIG. 2 is a view illustrating a handover signaling procedure of a mobile relay station 100 according to a first embodiment of the present invention.

FIG. 2 is a view illustrating a handover signaling procedure of the mobile RS 100 according to a first embodiment of the present invention. The handover signaling procedure of the mobile RS 100 according to the first embodiment of the present invention is a signaling procedure in a case in which there is no change in an RS configuration with respect to an access link when the mobile RS 100 performs handover.

When the mobile RS 100 determines that there is a need to perform handover to the target BS 320 through scanning (S200), the mobile RS 100 transmits a handover request message (AAI-HO-REQ, Advanced Air Interface-Handover-Request) to the superordinate BS 310 to start handover (S210). In case of a BS-controlled handover scheme, the superordinate BS 310 may start handover of the mobile RS 100 through a scanning information report (AAI-SCN-REP, Advanced Air Interface-Scanning-Reply) of the mobile RS 100, rather than receiving a handover request message (AAI-HO-REQ) from the mobile RS 100.

Upon receiving the handover request message (AAI-HO-REQ), the superordinate BS 310 selects the target BS 320 and transmits an RS handover request message (RS-HO-REQ, Relay Station-Handover-Request) to the target BS 320 (S220). Here, the RS handover request message (RS-HO-REQ) includes current RS configuration information of the mobile RS 100. Upon receiving the RS handover request message (RS-HO-REQ), the target BS 320 admits existing RS configuration information of the mobile RS 100 (S230). When the target BS 320 admits the existing RS configuration information of the mobile RS 100 and admits handover of the mobile RS 100, the target BS 320 transmits an RS handover response message (RS-HO-RSP, Relay Station-Handover-Response) to the superordinate BS 310 (S240). The RS handover response message (RS-HO-RSP) includes content admitting the handover of the mobile RS 100 and admitting the existing RS configuration information of the mobile RS 100.

Upon receiving the RS handover response message (RS-HO-RSP), the superordinate BS 310 transmits a handover command message (AAI-HO-CMD, Advanced Air Interface-Handover-Command) to the mobile RS 100 (S250). Here, the handover command message includes an indicator (HO of RS) indicating admission of handover of the mobile RS 100 and an indicator (HO without RS configuration change) indicating that the existing RS configuration information of the mobile RS 100 is maintained as is.

Upon receiving the handover command message (AAI-HO-CMD), the mobile RS 100 transmits a multimode broadcast message (AAI-MM-ADV, Advanced Air Interface-Multimode-Advertisement) to the subordinate terminal 200 (S260). The multimode broadcast message (AAI-MM-ADV) includes an indicator HO without RS configuration change) indicating that the existing RS configuration information of the mobile RS 100 is maintained as is and an indicator indicating a service unavailability section (holding time). Here, the service unavailability section (holding time) is set in consideration of a time for the mobile RS 100 to perform a procedure (i.e., a network reentry procedure) of handover to the target BS 320 and restart a relay mode and a time for the subordinate terminal 200 to resume a relay service. As shown in Table 2 below, the service unavailability section (holding time) may be set through an unavailable start time and an unavailable time interval.

In this manner, through the service unavailability section (holding time), the subordinate terminal 200 may be prevented from performing handover to a different BS or a different RS until when the mobile RS 100 resumes the relay mode after performing handover. Namely, when the multimode broadcast message (AAI-MM-ADV) is received, the subordinate terminal 200 defers data transmission and reception during the service unavailability section (holding time) and waits, without performing handover to a different BS or a different RS.

During the service unavailability section (holding time), the mobile RS 100 performs a procedure of handover (e.g., a network reentry procedure) to the target BS 320 (S270) and restarts the relay mode (S280).

After the service unavailability section (holding time) terminates, the subordinate terminal 200 resumes a service through the mobile RS 100 (S290). Here, in a case in which the subordinate terminal 200 cannot detect a preamble from the mobile RS 100 even after the service unavailability section (holding time) terminates, the subordinate terminal 200 may determine that the mobile RS 100 has a problem, and perform network reentry to a new BS or a new RS.

Figure 3:
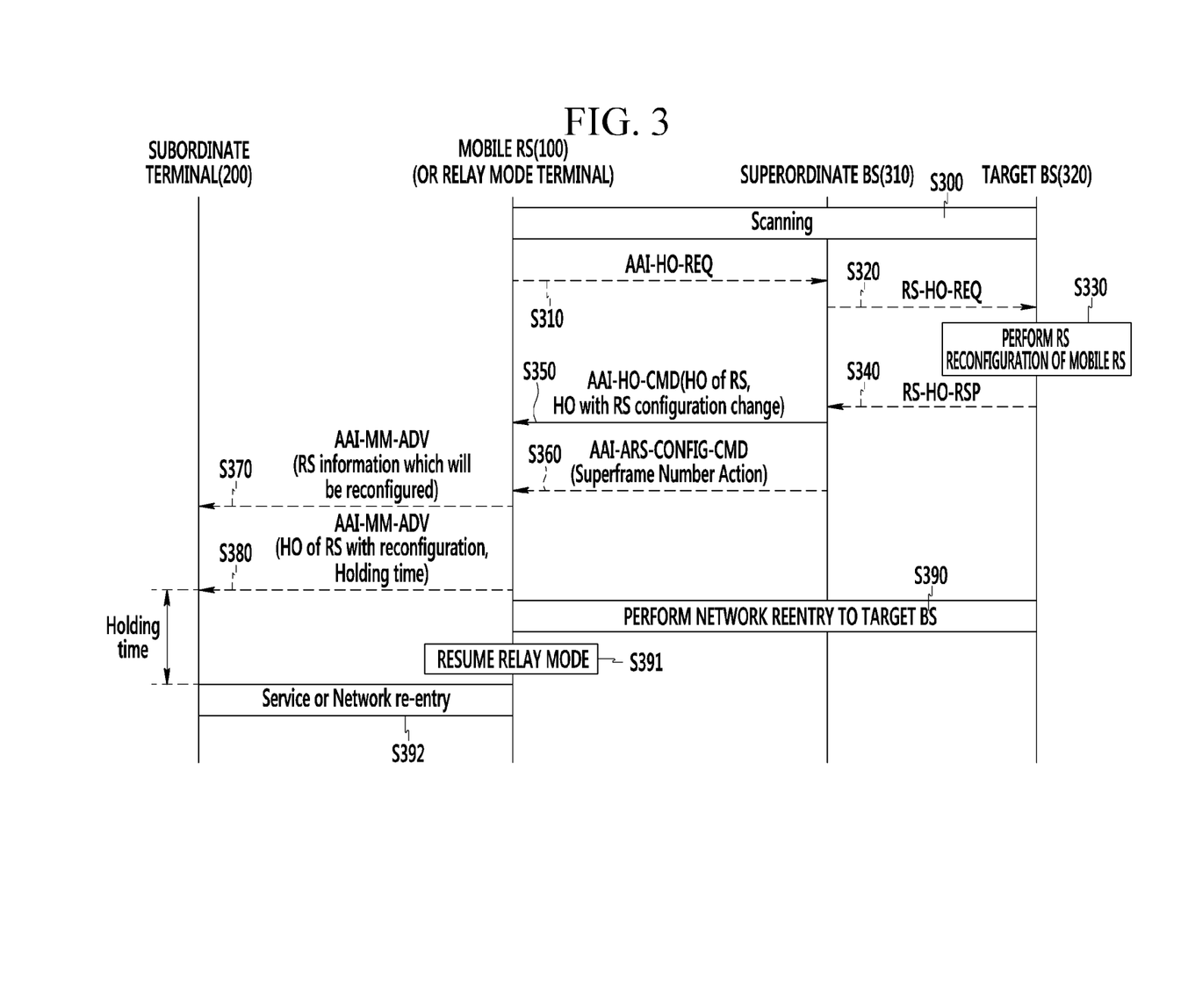
FIG. 3 is a view illustrating a handover signaling procedure of the mobile relay station 100 according to a second embodiment of the present invention.

FIG. 3 is a view illustrating a handover signaling procedure of the mobile RS 100 according to a second embodiment of the present invention. The handover signaling procedure of the mobile RS 100 according to the second embodiment of the present invention is a signaling procedure in a case in which an RS configuration with respect to an access link is changed in the event of handover of the mobile RS 100.

When the mobile RS 100 determines that there is a need to perform handover to the target BS 320 through scanning (S300), the mobile RS 100 transmits a handover request message (AAI-HO-REQ, Advanced Air Interface-Handover-Request) to the superordinate BS 310 to start handover (S310). In case of a BS-controlled handover scheme, the superordinate BS 310 may start handover of the mobile RS 100 through a scanning information report (AAI-SCN-REP, Advanced Air Interface-Scanning-Reply) of the mobile RS 100, rather than receiving a handover request message (AAI-HO-REQ) from the mobile RS 100.

Upon receiving the handover request message (AAI-HO-REQ), the superordinate BS 310 selects the target BS 320 and transmits an RS handover request message (RS-HO-REQ, Relay Station-Handover-Request) to the target BS 320 (S320).

Upon receiving the RS handover request message (RS-HO-REQ), the target BS 320 determines that RS reconfiguration is required for the mobile RS 200 (S330). Thus, when the target BS 320 determines that RS reconfiguration is required and admits handover of the mobile RS 200, the target BS 320 transmits a handover response message (RS-HO-RSP, Relay Station-Handover-Response) to the superordinate BS 310 (S340). The RS handover response message (RS-HO-RSP) includes handover admission information of the mobile RS 100 and RS reconfiguration information of the mobile RS 100.

Upon receiving the RS handover response message (RS-HO-RSP), the superordinate BS 310 transmits a handover command message (AAI-HO-CMD, Advanced Air Interface-Handover-Command) to the mobile RS 100 (S350). Here, the handover command message includes an indicator (HO of RS) indicating handover admission of the mobile RS 100 and an indicator (HO with RS configuration change) indicating that RS reconfiguration of the mobile RS 100 is required.

The superordinate BS 310 transmits an RS configuration command message (AAI-ARS-CONFIG-CMD, Advanced Air Interface-Advanced Relay Station-Configuration-Command) to the mobile RS 100 (S360). Namely, after the mobile RS 100 performs handover to the target BS 320, configuration information of RS physical (PHY) layer and MAC layer required for configuration is transmitted through an RS configuration command message (AAI-ARS-CONFIG-CMD). The RS configuration command message (AAI-ARS-CONFIG-CMD) includes an action time (or superframe number action) as to when the configuration information is to start. The action time is set in consideration of a period until when the mobile RS 100 completes handover.

Upon receiving the handover command message (AAI-HO-CMD) and the RS configuration command (AAI-ARS-CONFIG-CMD), the mobile RS 100 transmits a neighbor BS list broadcast message (AAI-NBR-ADV, Advanced Air Interface-Neighbor-Advertisement) and a multimode broadcast message (AAI-MM-ADV, Advanced Air Interface-Multimode-Advertisement) to the subordinate terminal 200 (S370 and S380). The neighbor BS list broadcast message (AAI-NBR-ADV) includes system information of the mobile RS (RS information). Here, the system information of the mobile RS is system information after the mobile RS performs handover and performs an RS reconfiguration procedure. Through such system information, the subordinate terminal 200 may detect the reconfigured mobile RS 100. The multimode broadcast message (AAI-MM-ADV) includes an indicator indicating that RS handover is performed and an indicator indicating a service unavailability section (holding time). Here, the service unavailability section (holding time) is set in consideration of a time for the mobile RS 100 to perform a procedure (i.e., a network reentry procedure) of handover to the target BS 320 and restart a relay mode and a time for the subordinate terminal 200 to resume a relay service. As described above with reference to FIG. 2, the service unavailability section (holding time) may be set through an unavailable start time and an unavailable time interval.

In this manner, through the service unavailability section (holding time), the subordinate terminal 200 may be prevented from performing handover to a different BS or a different RS until when the mobile RS 100 resumes the relay mode after performing handover. Namely, when the multimode broadcast message (AAI-MM-ADV) is received, the subordinate terminal 200 defers data transmission and reception during the service unavailability section (holding time) and waits, without performing handover to a different BS or a different RS.

During the service unavailability section (holding time), the mobile RS 100 performs a procedure of handover (e.g., a network reentry procedure) to the target BS 320 (S390) and configures a relay mode on the basis of the RS reconfiguration information to resumes the relay mode (S391). Here, the mobile RS 100 starts to configure the RS mode at an action time (or a superframe number action).

After the service unavailability section (holding time) terminates, the subordinate terminal 200 resumes a service through the mobile RS 100 (S392). However, in a case in which the subordinate terminal 200 cannot immediately resume the service through the mobile RS 100, the subordinate terminal 200 performs a network reentry procedure on the mobile RS 100 (S392). Meanwhile, in a case in which the subordinate terminal 200 cannot detect a preamble from the mobile RS 100 even after the service unavailability section (holding time) terminates, the subordinate terminal 200 may determine that the mobile RS 100 has a problem, and perform network reentry to a new BS or a new RS.

Figure 4:
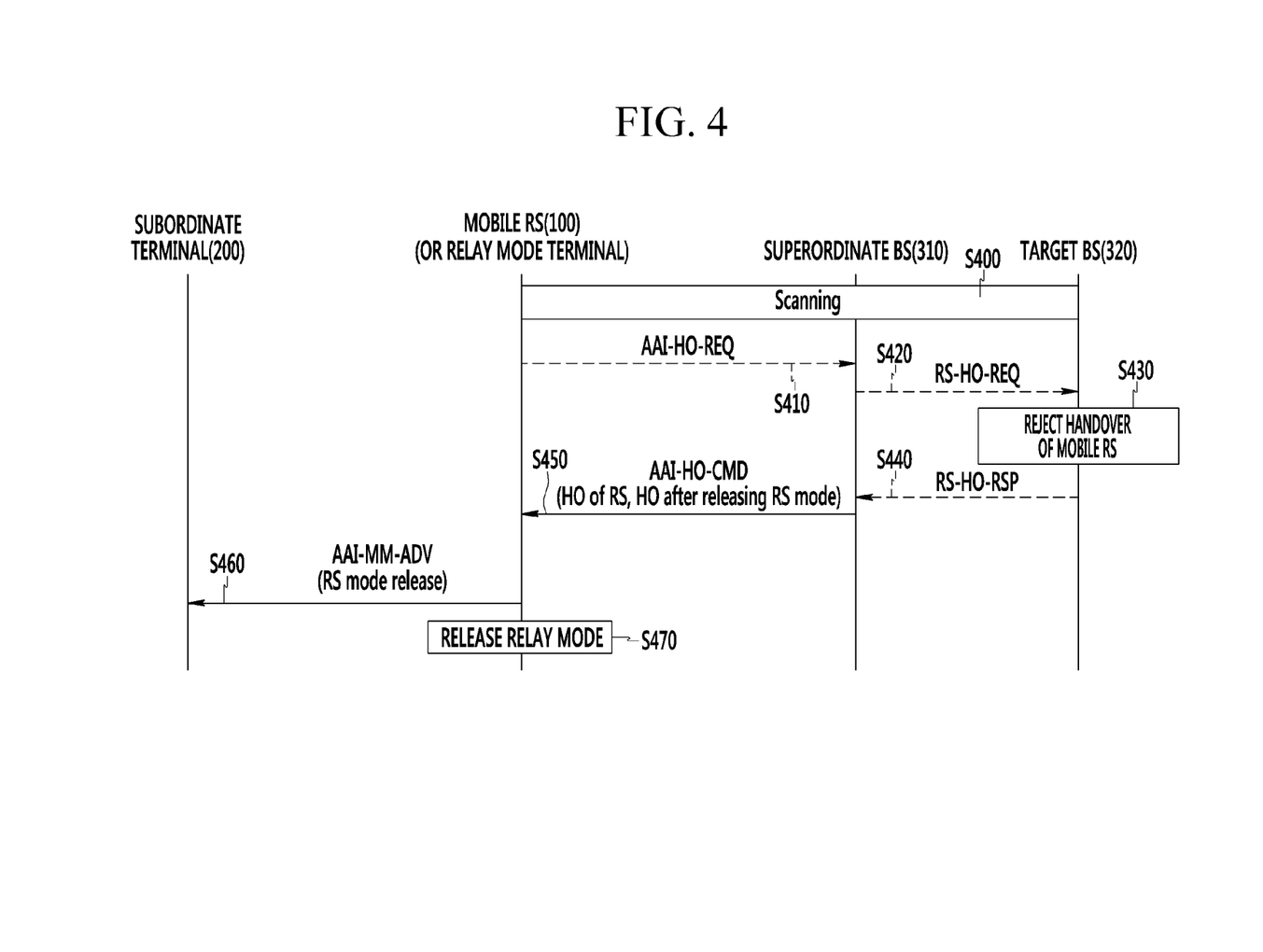
FIG. 4 is a view illustrating a handover signaling procedure of the mobile relay station 100 according to a third embodiment of the present invention.

FIG. 4 is a view illustrating a handover signaling procedure of the mobile RS 100 according to a third embodiment of the present invention. The handover signaling procedure of the mobile RS 100 according to the third embodiment of the present invention is a signaling procedure in a case in which the mobile RS 100 requests handover but the target BS 320 does not admit it.

When the mobile RS 100 determines that there is a need to perform handover to the target BS 320 through scanning (S400), the mobile RS 100 transmits a handover request message (AAI-HO-REQ, Advanced Air Interface-Handover-Request) to the superordinate BS 310 to start handover (S410). In case of a BS-controlled handover scheme, the superordinate BS 310 may start handover of the mobile RS 100 through a scanning information report (AAI-SCN-REP, Advanced Air Interface-Scanning-Reply) of the mobile RS 100, rather than receiving a handover request message (AAI-HO-REQ) from the mobile RS 100.

Upon receiving the handover request message (AAI-HO-REQ), the superordinate BS 310 selects the target BS 320 and transmits an RS handover request message (RS-HO-REQ, Relay Station-Handover-Request) to the target BS 320 (S420).

Upon receiving the RS handover request message (RS-HO-REQ), the target BS 320 determines that the handover of the mobile RS 100 is not admitted (S430). In this case, the target BS 320 transmits a handover response message (RS-HO-RSP, Relay Station-Handover-Response) including information indicating that handover of the mobile RS 100 is not admitted (S440).

Upon receiving the handover response message (RS-HO-RSP), the superordinate BS 310 transmits a handover command message (AAI-HO-CMD, Advanced Air Interface-Handover-Command) to the mobile RS 100 (S450). The handover command message (AAI-HO-CMD) includes an indicator indicating that RS handover is impossible and that handover is possible after the relay mode is released (HO after releasing RS mode).

Upon receiving the handover command message (AAI-HO-CMD), the mobile RS 100 may serve the subordinate terminal 200 until when it is disconnected from the superordinate BS. Also, the mobile RS 100 may release the relay mode and operate in a terminal mode to perform a general mobile terminal handover procedure to perform handover to the target BS 320.

Here, in the case in which the mobile RS 100 releases the relay mode and operates in the terminal mode to perform a general mobile terminal handover procedure, the mobile RS 100 transmits a multimode broadcast message (AAI-MM-ADV) to the subordinate terminal 200 (S460). The multimode broadcast message (AAI-MM-ADV) includes information indicating that the RS mode is released (RS mode release). The mobile RS 100 releases the relay mode (S470).

Table 1 below shows a format of the handover command message (AAI-HO-CMD) as described above.

TABLE 1

Format of AAI-HO-CMD message

| Field | Size (bits) | Value/Description | Condition |
|---|---|---|---|
| Mode | 2 | 0b00: HO command;<br>0b01: Zone switch command from MZone to LZone;<br>0b10: AMS HO request rejected (ABS in list unavailable). In this case, AAI-HO-CMD message shall not include any T-ABS. However, if the requested ABSs in list available but MAC information is not shared, those ABSs may be included candidate T-ABS and serving ABS transfers MS information via backbone network or relay link in HR-Network<br><s>0b11: Reserved.</s><br>0b11: HO command for HR-Network | N/A |
| If (Mode == 0b00 or 0b11) {<br>If(Mode == 0b11) {<br>Extended HO Mode | 2 | 0b00: Alternative Path<br>0b01: FBIS Initiation<br>0b10: FBIS Termination<br><s>0b11: Reserved.</s><br>0b11: HO command of HR-MS acting as relay | |
| If (Extended HO Mode == 0b00 ) {<br>Role | 1 | 0b0: Stay as HR-MS;<br>0b1: Change to HR-RS; | |
| } else if (Extended HO Mode == 0b01) {<br>Primary Serving ABS | 1 | 0b0: the AMS shall set its primary serving ABS as S-ABS (Degraded HR-BS) after network reentry<br>0b1: the AMS shall set its primary serving ABS as T-ABS (Target HR-BS) after network reentry | |
| Switched Access Mode | 1 | 0: Switched Access with fixed Switched Access Windows<br>1: Switched Access with variable Switched Access Windows | |
| If(Switched Access Mode==0 ) {<br>Switched Access Window Size | 8 | The size of fixed Switched Access Window in unit of frame | |
| } else if ( Switched Access Mode == 1) {<br>Maximum Switched Access Window Size<br>} | 8 | Maximum size of Switched Access Window in unit of frame | |
| Switching Access Start Time offset | 8 | Difference between Switching Access Start time and Action time in units of frames. The value of Switching Access Start time shall be calculated by adding this value with the value of Action time specified for this T-ABS. | |
| } else if (Extended HO Mode == 0b10) {<br>Termination Reason | 2 | 0b00: Backbone recovery<br>0b01: No connection for FBIS<br>0b10: Link failures<br>0b11: reserved | |
| <s>} // end of it (Extended HO Mode == 0b10)</s><br>} else if(Extended HO Mode == 0b11) {<br>RS reconfiguration | 1 | 0b0: No change RS configuration<br>0b1: Change RS configuration | |

Table 2 below shows a format of the multimode broadcast message (AAI-MM-ADV) as described above.

TABLE 2

Format of AAI-MM-ADV message

| Field | Size (bits) | Value/Description | Condition |
|---|---|---|---|
| Action Type | 4 | Used to indicate the purpose of this message<br>0b0000: Reconfiguration of HR-BS/RS including multimode BS/RS<br>0b0001: Restart of HR-BS/RS including multimode BS/RS<br>0b0010: Power down (including FA down) of HR-BS/RS including multimode BS/RS<br>0b0011: Power reduction of HR-BS/RS including multimode BS/RS<br>0b0100: Backhaul link down of HR-BS<br>0b0101: Backhaul linkup of HR-BS<br>0b0110: FA change of HR-BS/RS including multimode BS/RS<br>0b0111: Multimode service end of HR-MS<br>0b1000: Scanning operation for HR-MS acting as relay to maintain synchronization with the serving HR-BS<br>0b1001: Neighbor cell scanning<br>~~0b1010-0b1111: reserved~~<br>0b1010: HO of HR-MS acting as relay without reconfiguration<br>0b1011: HO of HR-MS acting as relay with reconfiguration<br>0b1100-0b1111: reserved | Mandatory |
| ~~If (Action Type == 0b0000 {~~ | | | ~~reconfiguration~~ |
| If (Action Type == 0b0000 \|\| 0b1011) { | | | // reconfiguration |
| New IDcell | 10 | New IDcell that the ABS will use after the reconfiguration process. | Optional |
| Frame configuration index | 6 | New mapping between value of this index and frame configuration is listed in Table 149, Table 150 and Table 151. | Optional |
| Unavailable Start Time (UST) | 8 | Start of unavailable time in unit of frame | Mandatory |
| Unavailable Time Interval (UTI) | 8 | Interval of unavailable time in unit of superframe | Mandatory |
| ~~} else if (Action Type == 0b0001) {~~ | | | ~~// restart~~ |
| } else if (Action Type == 0b0001 \|\| 0b1011) { | | | // restart |
| Unavailable Start Time (UST) | 8 | Start of unavailable time in unit of frame | Mandatory |

TABLE 2-continued

Format of AAI-MM-ADV message

| Field | Size (bits) | Value/Description | Condition |
|---|---|---|---|
| Unavailable Time Interval (UTI) | 8 | Interval of unavailable time in unit of superframe | Mandatory |
| ... | ... | ... | ... |

Table 3 below shows a format of the RS configuration command message (AAI-ARS-CONFIG-CMD) as described above.

TABLE 3

Format of AAI-ARS-CONFIG-CMD message

| Field | Size (bits) | Value/Description | Conditions |
|---|---|---|---|
| ... | ... | ... | ... |
| If (subordinate HR-MS is multimode MS acting as HR-RS in HR-Network) { | | | |
|   SA-PREAMBLE index | 10 | | Always present |
|   MS functionality maintenance indication | 1 | 0b0: MS functionality is maintained after role change<br>0b1: MS functionality is not maintained | Always present |
|   Cell bar information | 1 | If Cell bar bit == 0b1, this cell shall not be allowed for network entry or reentry | Always present |
|   Superframe Number Action | 8 | LSBs of the superframe number when HR-RS or multimode HR-MS start RS operation and apply the PHY operational parameters. | Always present |
|   If (subordinate HR-MS is acting as STR relay mode) { | | | |
|     Frame configuration index | 6 | The mapping between value of this index and frame configuration is listed in Table 149, Table 150 and Table 151. | Always present |
|     FFT size indication | 2 | 0b00: 2048 FFT<br>0b01: 1024 FFT<br>0b10: 512 FFT<br>0b11: reserved | Always present |
|     DL carrier frequency for BS and RS ($F_{BR\_DL}$) | 10 | Indicates the DL carrier frequency in unit of 100 KHz for MS acting as RS.<br>Used to receive from HR-BS in the DL relay zone. | Present if needed |
|     UL carrier frequency for BS and RS ($F_{BR\_UL}$) | 10 | Indicates the UL carrier frequency in unit of 100 KHz for MS acting as RS.<br>Used to transmit to HR-BS in the UL relay zone. | Present if needed |
|     DL carrier frequency for RS and MS ($F_{RM\_DL}$) | 10 | Indicates the DL carrier frequency in unit of 100 KHz for MS acting as RS in FDD. If the duplex mode is TDD, this carrier is used for DL/UL<br>Used to transmit to subordinate HR-MS in the DL in FDD.<br>Used to transmit/receive to/from subordinate HR-MS in TDD. | Shall be present if $F_{RM\_DL}$ is different from that of HR-BS' DL access zone |

TABLE 3-continued

Format of AAI-ARS-CONFIG-CMD message

| Field | Size (bits) | Value/Description | Conditions |
|---|---|---|---|
| UL carrier frequency for RS and MS ($F_{RM\_UL}$) | 10 | Indicates the UL carrier frequency in unit of 100 KHz for MS acting as RS in FDD. Used to transmit to subordinate HR-MS in the UL in FDD. | Shall be present if FRM UL is different from that of HR-BS' UL access zone |
| ~~Superframe Number Action~~ | 4 | ~~LSBs of the superframe number when HR-RS start RS operation and apply the PHY operational parameters.~~ | ~~Always present~~ |
| } | | | |
| } | | | |
| ... | ... | ... | ... |

Figure 5:
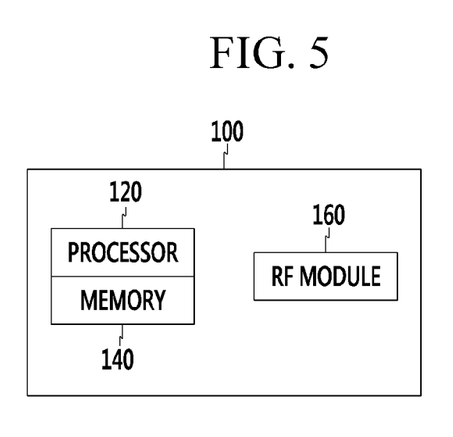
FIG. 5 is a view illustrating the mobile relay station 100 according to a first embodiment of the present invention.

FIG. 5 is a view illustrating the mobile RS 100 according to an embodiment of the present invention.

Referring to FIG. 5, the mobile RS 100 includes a processor 120, a memory 140, and a radio frequency (RF) module 160. The processor 120 may be configured to implement the procedures and methods described above with reference to FIGS. 2 through 4. The memory 140, connected to the processor 120, stores various types of information regarding an operation of the processor 120. The RF module 160, connected to the processor 120, transmits or receives a radio signal. The mobile RS 100 may have a single antenna or multiple antennas.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A handover method of a mobile relay station (RS) relaying data from a subordinate terminal to a first base station (BS), the method comprising:
   determining, by the mobile RS, whether to perform handover from the first BS to a second BS;
   when it is determined to perform handover in the determining operation, receiving from the first BS, a first message including a first information indicating whether handover is admitted and a second information indicating whether or not RS configuration information of the mobile RS has been changed, wherein the RS configuration information is related to an access link information between the mobile RS and the subordinate terminal;
   when handover admission information is included in the first message, transmitting, by the mobile RS to the subordinate terminal, a second message including a service unavailable time during which a service is not provided to the subordinate terminal; the second message further including the second information, wherein the service unavailable time is to prevent the subordinate terminal from performing handover to a different BS or a different RS and comprises an unavailable start time and an unavailable time interval;
   wherein the service unavailable time is set based on a time for the mobile RS to perform network reentry procedure to the second BS, to restart relay mode operation and to provide relay service to the subordinate terminal;
   performing, by the mobile RS, handover to the second BS;
   starting, by the mobile RS, a relay mode in which data of the subordinate terminal is relayed to the second BS; and
   providing a service to the subordinate terminal.

2. The method of claim 1, wherein the providing of the service comprises providing the service to the subordinate terminal after the service unavailable time terminates.

3. The method of claim 1, wherein the receiving of the first message comprises:
   requesting handover from the first BS; and
   receiving the handover admission information and the second information from the first BS.

4. The method of claim 1, wherein the second information indicates that RS configuration information of the mobile RS has been changed.

5. The method of claim 4, further comprising:
   receiving a third message including the changed RS configuration information from the first BS.

6. The method of claim 5, wherein the third message further includes an action time indicating when to start the changed RS configuration information.

7. The method of claim 5, further comprising:
   transmitting the changed RS configuration information to the subordinate terminal.

8. The method of claim 1, further comprising: when the first information indicating that the handover is not admitted is included in the first message, releasing the relay mode after the second information is transmitted to the subordinate terminal.

9. A communication method of a terminal which is connected to a first base station (BS) through a mobile relay station (RS), the method comprising:
   when it is determined that the mobile RS performs handover from the first BS to a second BS, receiving, from the mobile RS, a first message including a service unavailable time during which the mobile RS cannot provide a service to the terminal and information indicating whether or not RS configuration information of the mobile RS has been changed, wherein the service unavailable time is to prevent the terminal from performing handover to a different BS or a different RS and comprises an unavailable start time and an unavailable time interval, wherein the service unavailable time is set based on a time for the mobile RS to perform network reentry procedure to the second BS, to restart relay mode operation and to provide relay service to the terminal and wherein the RS configuration information is related to an access link information between the mobile RS and the terminal, and not performing connection to the mobile RS during the service unavailable time, and performing connection to the mobile RS after the service unavailable time terminates.

10. The method of claim 9, wherein the first message includes information indicating that RS configuration information of the mobile RS has been changed, wherein the method further comprises: receiving the changed RS configuration information from the mobile RS.

11. A mobile relay station (RS) comprising:

a radio frequency (RF) module; and a processor connected to the RF module and provide control to relay data from a subordinate terminal to a first base station (BS), wherein when it is determined that handover is performed from the first BS to a second BS, the processor provides control to receive from the first BS, a first message including a first information indicating admission of the handover and a second information indicating whether or not RS configuration information of the mobile RS has been changed, wherein the RS configuration information is related to an access link information between the mobile RS and the subordinate terminal and provides control to transmit to the subordinate terminal a second message including a service unavailable time during which a service cannot be provided to the subordinate terminal, the second message further including the second information;

wherein the service unavailable time is to prevent the subordinate terminal from performing handover to a different BS or a different RS and comprises an unavailable start time and an unavailable time interval;

wherein the service unavailable time is set based on a time for the mobile RS to perform network reentry procedure to the second BS, to restart relay mode operation and to provide relay service to the subordinate terminal;

the processor further performing handover to the second BS, starting a relay mode in which data of the subordinate terminal is relayed to the second BS and providing a service to the subordinate terminal.

12. The mobile relay station of claim 11, wherein the first message includes information indicating that RS configuration information of the mobile RS has been changed, wherein the processor provides control to transmit the changed RS configuration information to the subordinate terminal.

13. The mobile relay station of claim 11, wherein the processor provides control to provide a service to the subordinate terminal after the service unavailable time terminates.

* * * * *